Aug. 30, 1960 R. T. BRASHEAR 2,951,211

DIFFERENTIAL CHOPPER-AMPLIFIER

Filed May 16, 1958 2 Sheets-Sheet 1

INVENTOR.
R.T. BRASHEAR

BY Hudson & Young
ATTORNEYS

INVENTOR.
R.T. BRASHEAR
BY Hudson & Young
ATTORNEYS

United States Patent Office 2,951,211
Patented Aug. 30, 1960

2,951,211
DIFFERENTIAL CHOPPER-AMPLIFIER

Roy T. Brashear, Bartlesville, Okla., assignor to Phillips Petroleum Company, a corporation of Delaware Filed May 16, 1958, Ser. No. 735,849
11 Claims. (Cl. 332—9)

This invention relates to improvements in amplifiers. In one specific embodiment it relates to improvements in transistorized amplifiers which are suitable for use in automatic process control.

With the increased instrumentation in chemical plants it is becoming more desirable that the various control components be rugged, of simple construction, and of such a nature that a minimum quantity of repair parts must be kept on hand. Demands for commercial quantities of products of higher purity and specification quality have placed greater demands on control systems for increased accuracy and precision of control. Often-times modern instruments and instrument systems include means for automatically recalibrating themselves, e.g., the copending application Serial No. 726,606 of M. C. Burke, filed April 10, 1958, entitled "Chromatographic Analyzer Peak Reader." This invention relates to such means.

One purpose for which the instant invention is especially suitable is the pre-amplification or amplification of small signals which indicate an unbalanced condition in a control instrument, such as a Wheatstone bridge, so that the amplified signal will be of proper magnitude for an automatic calibrating operation. The balancing, or recalibration, is frequency termed a "zeroing operation." This involves the amplification of small direct current (D.C.) signals. It has been the practice in the prior art to amplify these small direct current signals by sending them in sequence through a chopper, transformer, several stages of amplification, and finally a motor or other means which responds through the signal to bring about the adjustment required.

Accordingly, this invention comprises an amplifier having desired features of simplicity, small quantity of unlike parts, and which is suitable for amplifying a small D.C. signal. Differential amplification may also be accomplished by this device. The main features of this amplifier are that it has no transformer but employs impedance circuits that comprise a plurality of capacitances which cooperate with a transistor to accomplish this result. A chopper alternately and sequentially directs portions of the input (D.C.) signal to one or the other of the impedance circuits which react somewhat like a voltage doubler and impresses the chopped signal on the transistor.

In the preferred embodiment appropriate circuit elements are provided to compensate for fluctuations in direct current signals which may occur due to the latter being derived from rectified alternating currents, or which may occur by reason of the circuit becoming capacitance coupled to an alternating current field to which it may be exposed.

It is an object of this invention to provide an improved amplifier. It is still a further object of this invention to provide a transistorized amplifier suitable as a means for servomotor control in the automatic zeroing of instrument systems. Other objects and advantages will become apparent from the following disclosure.

Figure 1:
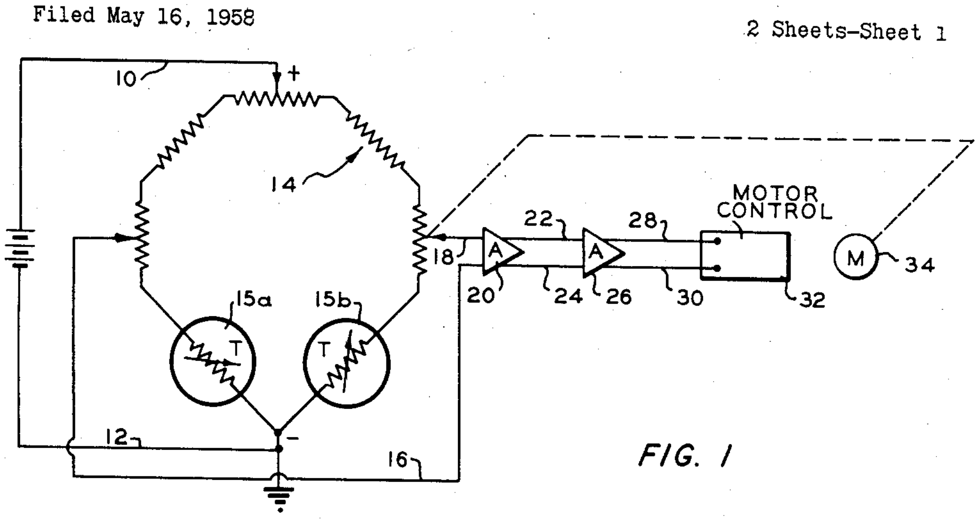
Figure 1 shows a schematic diagram of an assembly in which the instant invention would be employed.

Referring now to Figure 1 there are shown leads 10 and 12 which provide a Wheatstone bridge 14 with direct current (D.C.) power. The power source may be rectified A.C. or a battery. Lead 12 is connected to ground. Thermistors *15a* and *15b* represent bridge resistors, the resistance of which changes with temperature. These elements could also comprise bolometers or the like. They could even comprise photocells that generate their own signal, in which case the leads 10 and 12 could be eliminated and the circuit of Figure 3 (discussed below) might be used as the amplifier 20. In any event, the elements 15 represent the means by which unbalance the bridge in a measuring operation. The lead 16 and the contactor 18 provide output signals from the bridge to the amplifier 20 which comprises the instant invention. The signal from 20 is transmitted via leads 22 and 24 to an amplifier 26, thence via leads 28 and 30 to a control device such as the control windings 32 of a shaded pole servomotor 34 which operates to adjust the contactor 18 responsive to the signal received.

Figure 2:
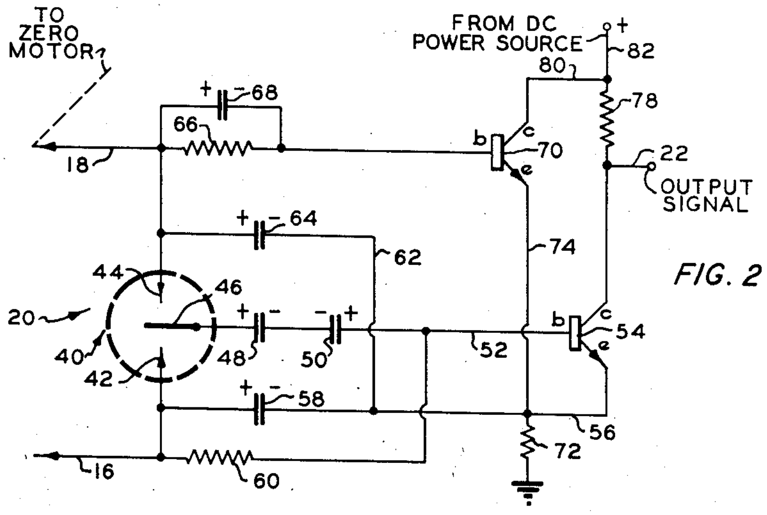
Figure 2 shows a preferred embodiment of the invention.

In Figure 2 are shown the details of the amplifier 20. There is provided a chopper 40 having first and second contacts 42 and 44, respectively, and a contactor 46 swinging between the two contacts. The chopper contactor 46 is actuated by alternating current (A.C.) from a transformer, as is explained hereinafter with respect to Figure 4. The leads 16 and 18 connect to the respective contacts 42 and 44. The contactor 46 is connected to a capacitor 48 which is in turn connected to another capacitor 50 that is connected by a lead 52 to the base of an amplifying transistor 54. The emitter of the transistor 54 is connected by a lead 56 to one side of a capacitor 58 the other side of which is connected to the contact 42. The latter is connected to resistor 60 which is connected to lead 52. A lead 62 connects the lead 56 to another capacitor 64 which is in turn connected at the other side thereof to the contact 44.

A resistor 66 and a capacitor 68 are connected in parallel between the lead 18 and the base of a stabilizing transistor 70. The emitters of both transistors 54 and 70 are connected to each other by the junction of leads 74 and 56, thence to ground through a resistor 72. The output signal appears on lead 22 which is connected to the collector of transistor 54. One end of a resistor 78 is connected to the lead 22 and the other end is connected to a lead 82 which in turn connects to a source of direct current power. Still another lead 80 connects the lead 82 to the collector of the transistor 70.

Figure 3:
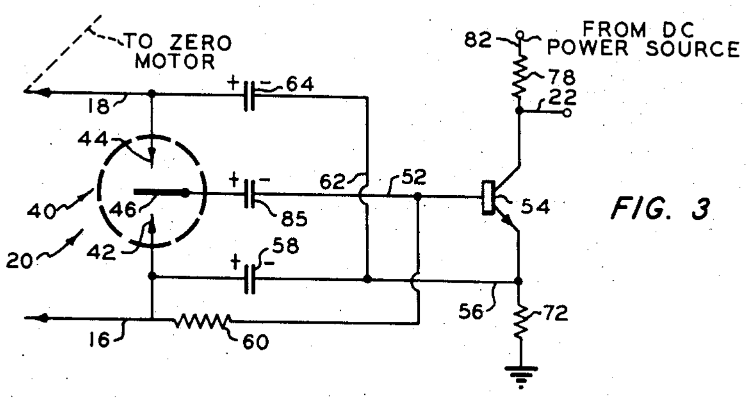
Figure 3 shows a modification of Figure 2.

Referring now to Figure 3 there is shown a modification of the amplifier of Figure 2 which is suitable for use where it is not necessary to compensate for the effects of alternating current. The elements above denoted as 66, 68 and 70 are no longer essential to accuracy because their function is primarily to correct for fluctuations in the D.C. voltage caused either by ripple in rectification or by stray A.C. effects. Another is that the two capacitors 48 and 50 have been replaced with a single capacitor 85. Otherwise, the circuit is substantially the same as shown in Figure 2.

Figure 4:
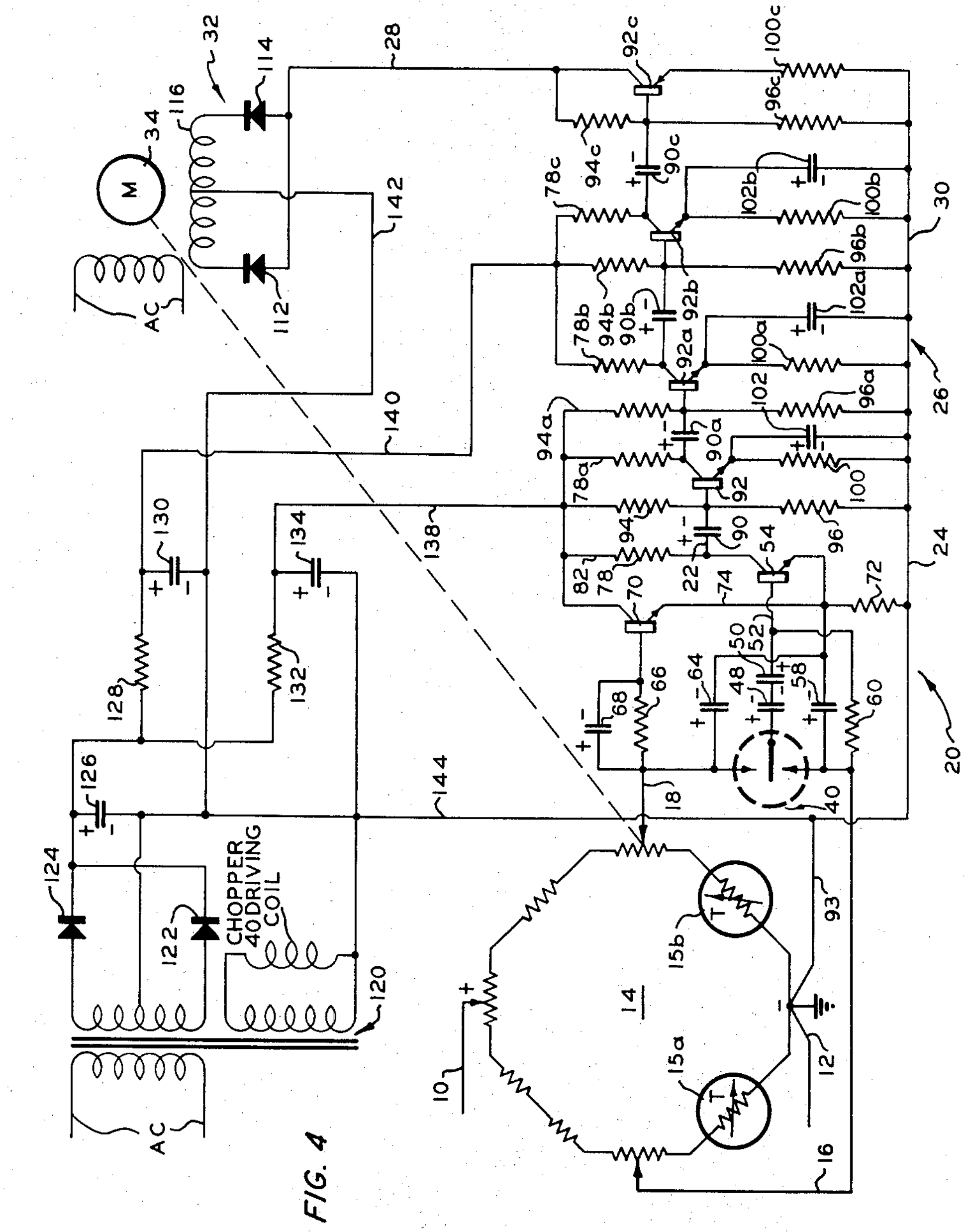
Figure 4 shows the details of the apparatus of Figure 1.

Figure 4 shows in detail the circuitry involved in one embodiment of the apparatus as constructed. The bridge 14 and amplifier assembly 20 are connected as shown in Figures 1 and 2. The output from the amplifier 20 appears on the lead 22 which is connected to one side of the decoupling condenser 90, the other side of which is connected to the base of the transistor 92. The lead 24 is connected to a lead 93 which is connected to ground. The base is also connected to a power source through a resistor 94 and to ground through a resistor 96. The emitter of transistor 92 is connected to ground through a resistor 100 and a capacitor 102. The collector of the resistor provides the output signal to the next successive stage of amplification.

The signal that appears on the collector of the transistor 92 is then further amplifier in two more stages constructed like that for transistor 92. For ease of identification of parts in these next two succeeding stages similar elements have been given in numerical designation, e.g., transistors have been numbered **92*a* and 92*b*. A power stage is provided having a transistor 92*c* of PNP type. Although this final stage is constructed somewhat like the preceding stages, there are differences in that the resistor 94*c* connects the base to the collector and the resistor 100*c*** (emitter to ground) is of quite low resistance.

The circuit from the decoupling condenser 90 through to the lead 28 comprises the amplifier 26 of Figure 1. The output signal from the entire circuit appears in the lead 28 and is fed to the control windings 32 of the motor 34. The control windings comprise two diodes 112 and 114 connected between the lead 28 and respective opposite ends of control windings 116.

A transformer 120 provides power to the magnet coil of chopper 40 and to the rectifier comprising diodes 122, 124 which in turn provide D.C. power to the various resistors 78, 94. The rectifier further includes the capacitor 126, the filter comprising resistor 128 and capacitor 130 and another filter comprising the resistor 132 and capacitor 134. A lead 138 connects the filter 132—134 to the lead 82 which comprises the power input for the amplifier 20 of the instant invention and also provides power to the first stage (e.g., 92) of the amplifier 26. A lead 140 connects the filter 128—130 to the power input of the second two stages of the amplifier 26. A lead 142 connects the center tap of the control windings 116 to the transformer and to lead 144 which is connected to ground lead 93. The servomotor 34 receives A.C. power from the same source as the transformer 120.

In an actual embodiment the following proportions were used in construction:

| Element number: | Size or description |
|---|---|
| **54, 72, 92, 92*a*, 92*b*** | 2 N 335 |
| **92*c*** | 2 N 278 |
| **112, 114, 122, 124** | I N 92 |
| **48, 50, 68** | 110, μf., 3 v. |
| **58, 64, 102, 102*a*, 102*b*** | 200, μf., 3 v. |
| **90, 90*a*, 90*b*** | 20, μf., 30 v. |
| **90*c*** | 100, μf., 30 v. |
| **130, 134** | 100, μf., 50 v. |
| **126** | 100, μf., 200 v. |
| **60, 66** | 10 KΩ, ½ w. |
| **72** | 2.2 KΩ, ¼ w. |
| **78, 78*a*, 78*b*** | 22 KΩ, ¼ w. |
| **94, 94*a*, 100*b*** | 220 KΩ, ¼ w. |
| **96, 96*a*** | 27 KΩ, ¼ w. |
| **100, 100*a*** | 1.8 KΩ, ¼ w. |
| **94*b*** | 33 KΩ, ¼ w. |
| **96*b*** | 5.1 KΩ, ¼ w. |
| **78*c*** | 1.5 KΩ, ¼ w. |
| **100*c*** | 2 Ω, ¼ w. |
| **128** | 12 KΩ, ¼ w. |
| **132** | 47 KΩ, ¼ w. |
| **96*c*** | 1 KΩ, ¼ w. |
| **94*c*** | 330 KΩ, ¼ w. |

In the embodiments shown in Figures 1 and 4 there are shown circuits for zeroing a Wheatstone bridge responsive to unbalance sensed therein. This is accomplished by adjusting the contactor 18 until zero signal is provided to the control windings 32 of the servomotor 34. Of course, if there is no unbalance, there will be no actuation of the system. In operation, any unbalance in the bridge is transmitted to the lead 16 and the contactor 18, and is then chopped by the chopper 40. Generally this unbalance is a D.C. signal of small magnitude, on the order of 50 microvolts. Signals as small as 10 microvolts can be handled. In the embodiment shown, the input signal to the base of the power transistor **92*c*** is 2 volts.

There may be slight fluctuations in the voltage appearing from leads 16 and 18 to ground due to ripple from leads 10 and 12 when rectified alternating current (A.C.) is supplied to the bridge or due to stray capacitive coupling to nearby sources of alternating current. Therefore, it is necessary to compensate for this, and the circuit embodied in capacitor 68, resistor 66, and transistor 70 is provided to accomplish this correction. Correction is achieved by applying the signal from the emitter of 70 to the emitter of transistor 54 and by applying the signal through the resistor 60 to the base of the transistor 54. Fluctuations in the rectified current will be sensed between the base and the emitter and since they will occur simultaneously, the output at the collector of 54 will be an amplified direct current free of errors due to imperfect rectification.

As the contactor 46 passes back and forth between contacts 42 and 44 the chopped signal is provided to the base of 54 alternately through the circuit that includes: 42, 48, 50, 52, transistor 54 and the capacitor 58; and the circuit that includes 44, 46, 48, 50, 54, 56, 62 and 64. The chopped signal is amplified in the transistor 54, appears on its collector, and ultimately on the lead 22 as the output signal. This signal, in the embodiment shown, is then subjected to the amplification in successive stages that comprise the amplifier 26 in Figure 1. Finally the amplified signal appears on the lead 28 from whence it is directed to the control windings 32 and while impressed thereon directs the direction and amount of rotation of the motor 34. The motor 34 turns and adjusts the position of the contactor 18 thereby zeroing the bridge 14. When the bridge is zeroed no signal will appear across the leads 16 and 18.

In Figure 2 a pair of condensers 48, 50 are employed because this construction allows a large increase in potential drop without breakdown of the condensers 48, 50 due to polarity reversal. If desired, of course, a single capacitor (e.g., 85 of Figure 3) could be used, at the sacrifice of this protection. In the preferred embodiment all capacitors are electrolytic condensers.

It should be apparent from the foregoing description that the instant invention presents an improved amplifier of rugged, simple construction, suitable for amplifying small D.C. signals. It is also suitable as a differential amplifier. A large number of the electrical components are of the same characteristics, hence maintenance problems are decreased.

It is my intention to include all modifications to the disclosed apparatus which would be apparent to one skilled in the art.

I claim:

1. An improved differential amplifier comprising a chopper having a contactor and first and second contacts; means for connecting said first and second contacts to the source of a signal to be amplifier; a stabilizing transistor having a base, a collector, and an emitter; an amplifying transistor having a base, a collector, and an emitter; first and second resistors; first, second, third, fourth, and fifth capacitors; first means for connecting said first and second capacitors in series between said chopper contactor and said amplifying transistor base; second means for connecting one end of said first resistor to said first contactor; third means for connecting the other end of said first resistor to a point located on said first means between said first and second capacitors and said amplifying transistor base; fourth means for connecting one side of said third capacitor to said first contactor; fifth means for connecting one side of said fourth capacitor to said second contactor; sixth means for connecting the other side of said third capacitor to the other side of said fourth capacitor; seventh means for connecting said sixth means to the respective emitters of said amplifying and said stabilizing transistors; eighth means for connecting said fifth capacitor in parallel with said second resistor between said chopper second contact and said stabilizing transistor base; means for supplying direct current power to said stabilizing transistor collector; an output terminal; and means connecting said output terminal to said amplifying transistor collector.

2. The apparatus of claim 1 further including a third resistor, and means for connecting said amplifying transistor emitter to ground through said third resistor.

3. An improved amplifier comprising a chopper having a contactor moving between first and second contacts; means for connecting said first and second contacts to a source of a signal to be amplifier; a first capacitor having one side thereof connected to said first contact; a second capacitor having one side thereof connected to said contactor; a third capacitor having one side thereof connected to said second contact; an amplifying transistor having a base, a collector and an emitter; means for connecting the other sides of said first and third capacitors, respectively to said transistor emitter; means for connecting the other side of said second capacitor to said transistor base; a resistor; means for connecting one end of said resistor to said first chopper contact and the other end thereof to said transistor base; and an output terminal connected to said collector.

4. The apparatus of claim 3 further including another resistor, and means for connecting said amplifying transistor emitter to ground through said another resistor.

5. The apparatus of claim 3 further including a second transistor having a base, a collector and an emitter; means for connecting said second transistor emitter to said amplifying transistor emitter; a second resistor connected between said chopper second contact and said second transistor base; and another capacitor connected in parallel with said second resistor.

6. The apparatus of claim 5 further including means for connecting both of said emitters to ground.

7. The apparatus of claim 5 further including another resistor connected between the respective collectors of said transistors.

8. The apparatus of claim 3 wherein said capacitors comprise electrolytic condensers.

9. The apparatus of claim 3 wherein said means for connecting said second capacitor to said base includes means for protecting said second capacitor against reversal in the polarity of the signal on said resistor.

10. The apparatus of claim 9 wherein said means for protecting includes another capacitor.

11. An improved amplifier comprising a pair of input terminals, means for converting direct current appearing at said terminals into alternating current; transistor means for amplifying having first, second, and output terminals; an impedance; means for applying the alternating current produced by the first said means to the first terminal of the second said means through said impedance; means for temporarily storing potentials connected between each one of said pair of input terminals and said second terminal of said transistor means; and means for applying a portion of the potential of a signal appearing at one of said pair of terminals to said first terminal of said transistor means.

References Cited in the file of this patent

UNITED STATES PATENTS

| | | |
|---|---|---|
| 2,285,482 | Wunsch | June 9, 1942 |
| 2,459,730 | Williams | Jan. 18, 1949 |
| 2,889,517 | Ehret | June 2, 1959 |

UNITED STATES PATENT OFFICE
CERTIFICATE OF CORRECTION

Patent No. 2,951,211

August 30, 1960

Roy T. Brashear

It is hereby certified that error appears in the printed specification of the above numbered patent requiring correction and that the said Letters Patent should read as corrected below.

Column 4, line 68, and column 5, line 24, for "amplifier", each occurrence, read -- amplified --.

Signed and sealed this 25th day of April 1961.

(SEAL)
Attest:

ERNEST W. SWIDER
Attesting Officer

DAVID L. LADD
Commissioner of Patents